Jan. 31, 1928.

L. E. ZERBE 1,657,773

FLEXIBLE COUPLING

Filed Oct. 20, 1926

Inventor
Lewis E. Zerbe
by Hazard and Miller
Attorneys

Patented Jan. 31, 1928.

1,657,773

UNITED STATES PATENT OFFICE.

LEWIS E. ZERBE, OF MONETA, CALIFORNIA.

FLEXIBLE COUPLING.

Application filed October 20, 1926. Serial No. 142,904.

My invention is a flexible coupling for rotating shafts to transmit rotary motion from one shaft to the other.

An object of my invention is the construction of a flexible coupling connecting two rotary shafts, either of which may be a driving shaft and the other a driven shaft or both may be driven, the coupling keeping said shafts at similar speed and for any other type of connection of rotary shafts.

A further object of my invention is a coupling which will accommodate shafts which are in axial alinement or slightly out of alinement, in which the ends of the shafts at the coupling have a whipping action and also for shafts which have a slight longitudinal movement axially towards and from each other.

A more specific object of my invention is in the construction of the coupling whereby a plurality of clamps having flanges are attached to contiguous ends of the two shafts, each coupling or flange having a journal box connected thereto. The journal boxes on opposite couplings or flanges are connected by dumb-bell type of bars having ball ends connecting in the sockets of the journal members. The coupling may transmit rotary motion from one shaft to the other either by operating with the dumb-bell type of bars under a tension or compression.

My invention will be more readily understood from the following description and drawings, in which;

Figure 1 is a side elevation of my coupling connected to two shafts;

Fig. 2 is an enlarged elevation of the coupling partly broken away;

Fig. 3 is a transverse section on the line 3—3 of Fig. 2 in the direction of the arrows;

Fig. 4 is a detail through the ball and socket connections taken on the line 4—4 of Fig. 3.

The two shafts are designated by the numerals 1 and 2, being connected by the flexible coupling designated generally by the numeral 3. This coupling transmits a rotary motion from one shaft to the other, or causes two driven shafts to operate at the same speed.

The coupling is formed of two main clamps 4 and with their associated mechanism are the same on both shafts. Each clamp has a split 5 and on one side of the split there is a lug 6 with a suitable aperture therethrough through which extends a stud or bolt 7. Such bolt or stud extends into the base portion of the clamp and by means of a nut 9 holds the clamp tight on the shaft. It is preferable to also use keys 10 for each of the clamps.

Formed integral with each clamp is a heavy flange 11 and integrally connected with the flange and the clamp are bearing boxes 12, there being illustrated two of these connected to each of the clamps and flange. A grease receptacle 13 is formed in the clamp structure having a filling passage 14 closed by a plug 15.

Each of the bearing boxes has an abutment bearing 16 with a semi-spherical bearing therein and with a screw threaded split clamping bearing 17, this being threaded in the bearing box and being adjustable by a wrench head 18.

Connecting bars designated generally by the numeral 19 are formed dumb-bell shaped, having a bar section 20 with balls 21 at each end, these balls fitting between the bearings 16 and 17 and being clamped therein.

The oiling system comprises a duct 22 extending from the oil chamber or receptacle 13 into the interior of the bearing boxes. Preferably an annular groove 23 is formed in the bearing 16 and a plurality of longitudinal grooves 24 also in the bearing 16 lead to the space 25 between the bearings 16 and 17.

An annular recess 26 is formed in each of the bearings 17 and has a felt or other gasket 27 fitted therein. To maintain the proper adjustment of the bearings, the wrench head 18 is formed castellated, having a series of notches 28, such notches being engaged by a slidable pin 29 which fits in a recess 30, being outwardly pressed by a spring 31, there being a screw threaded collar 32 preventing the head 33 of the pin drawing out.

The manner of assembling my flexible coupling is substantially as follows:

Each of the clamps with the integral flange is connected to the ends of the shafts and securely connected thereto and being held by the keys from independent rotation. The abutment bearings 16 are fitted in the bearing boxes and the connecting bars fitted by screwing the bearings 17 into the bearing boxes, these being adjusted until the balls have the proper fit in each of the bearings.

It will thus be seen that the opposite bearing boxes and bearings on the two opposite clamps and the flanges are connected together by the connecting bars and hence when one of the shafts is rotated the rotational movement is communicated to the other shaft through the medium of the connecting bars. It is obvious that these bars may act either under tension or compression.

The grease for oiling may be filled in the grease receptacle or chamber and will be drawn outwardly by centrifugal action, thoroughly lubricating the ball and socket bearings of the connecting bars. These bearings are always maintained at the desired setting through the medium of the slidable pins 29 engaging in the notches 28.

From the above description it will be obvious that I have developed a flexible coupling which will function when the shafts are in exact axial alinement or when they are slightly inclined over each other and will also function should the ends of the shafts have a whipping action in rotation and constantly change their angle of inclination one to the other. The ends of the shafts and clamps may be placed quite a considerable distance apart and also accommodate an axial movement of one shaft relative to the other which is frequently necessary in transmitting rotary motion by flexible shafts.

It will also be apparent that by the proper design of my coupling that it may be utilized in effect as a universal joint provided the angle of inclination of the two shafts is not too great. It is believed unnecessary to enumerate instances in which my coupling may be utilized or detail the changes which may be made to adapt same for different industrial purposes.

Various changes may be made in the principles of my invention without departing from the spirit thereof as set forth in the description, drawings and claims.

What I claim is:

1. A flexible coupling comprising in combination a pair of shafts, a split collar connected to the end of each shaft, a flange formed integral with the collar, a plurality of bearing boxes integral with each collar and flange, an abutment bearing having a semi-spherical bearing surface in each bearing box, a clamping bearing fitted in the open end of each bearing box, connecting bars having a bar section and ball ends, the ball ends being fitted in the abutment bearing and the clamping bearing, the said connecting bars being substantially transverse to the shafts.

2. A flexible coupling comprising a pair of split collars having a flange formed integral therewith, means to clamp the split portion of the collars on the ends of the shafts, a plurality of bearing boxes formed integral with each collar and flange, abutment bearings fitted in each bearing box, clamping bearings secured in the bearing blocks, connecting bars having bar sections and balls at the end, the balls fitting between the abutment bearings and the clamping bearings, the collars having oil receptacles and ducts extending therefrom to the bearing boxes and oil grooves in the abutment bearings leading oil to the balls of each connector bar.

3. A flexible coupling comprising in combination a pair of collars adapted to be clamped each to a shaft, bearing boxes rigidly secured to the collars, tension transmitting connecting bars fitted between the bearing boxes, there being means to secure the ends of said bars in boxes on opposite collars and form a bearing, oil receptacles formed in the collars and having passages from said receptacles to the bearing boxes.

4. A flexible coupling comprising in combination a pair of shafts each having a clamp or collar at the end, bearing boxes rigid on the collars having bearings therein, and tension transmitting connector bars having a bar section and ball ended sections fitted in the said bearings, the connector bars being transverse to the shafts, the collars having oil receptacles formed therein and passages for oil from said receptacles to the bearing boxes.

In testimony whereof I have signed my name to this specification.

LEWIS E. ZERBE.